United States Patent
Wang et al.

(10) Patent No.: US 12,242,585 B2
(45) Date of Patent: Mar. 4, 2025

(54) METHOD, APPARATUS AND DEVICE FOR UPDATING FEATURE VECTOR DATABASE, AND MEDIUM

(71) Applicant: CHINA UNIONPAY CO., LTD., Shanghai (CN)

(72) Inventors: Weipeng Wang, Shanghai (CN); Jialiang Kang, Shanghai (CN); Kai Bian, Shanghai (CN); Naigeng Ji, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/689,811

(22) PCT Filed: Oct. 9, 2022

(86) PCT No.: PCT/CN2022/123997
§ 371 (c)(1),
(2) Date: Mar. 6, 2024

(87) PCT Pub. No.: WO2023/134232
PCT Pub. Date: Jul. 20, 2023

(65) Prior Publication Data
US 2024/0378275 A1 Nov. 14, 2024

(30) Foreign Application Priority Data
Jan. 13, 2022 (CN) .......................... 202210036515.1

(51) Int. Cl.
*G06F 21/32* (2013.01)
*G06F 16/23* (2019.01)

(52) U.S. Cl.
CPC .............. *G06F 21/32* (2013.01); *G06F 16/23* (2019.01)

(58) Field of Classification Search
CPC .................................. G06F 21/32; G06F 16/23
See application file for complete search history.

(56) References Cited

U.S. PATENT DOCUMENTS 8,677,139 B1 * 3/2014 Kalocsai ............... H04L 9/3231
713/168
10,142,333 B1 * 11/2018 Griffin .................. H04L 9/3231
(Continued)

FOREIGN PATENT DOCUMENTS

| CN | 107392237 A | 11/2017 |
| CN | 107610709 A | 1/2018 |

(Continued)

OTHER PUBLICATIONS

The Office Action dated May 10, 2023 for Taiwanese Application No. 111137394.
(Continued)

*Primary Examiner* — Piotr Poltorak

(57) ABSTRACT

The present application discloses a method, an apparatus, and a device for updating a feature vector database, and a medium. The method includes: acquiring a first biological feature in a service request; obtaining, according to the first biological feature, a first feature vector and a second feature vector respectively through a first algorithm model and a second algorithm model, in which a first feature vector database include sample feature vectors obtained based on the first algorithm model; performing validity verification on the second feature vector according to an associated feature vector for a first user corresponding to a first sample feature vector; and obtaining, under a condition that the validity verification on the second feature vector passes, a second sample feature vector for the first user based on the second feature vector, and storing the second sample feature vector in a second feature vector database.

16 Claims, 8 Drawing Sheets

(56) References Cited

U.S. PATENT DOCUMENTS

| | | | |
|---|---|---|---|
| 10,572,641 B1* | 2/2020 | Griffin | H04L 9/50 |
| 11,373,257 B1* | 6/2022 | Guo | G06N 20/00 |
| 11,527,107 B1* | 12/2022 | Mostafa | G06V 10/751 |
| 2014/0230033 A1* | 8/2014 | Duncan | G06F 21/32 |
| | | | 726/7 |
| 2018/0181737 A1* | 6/2018 | Tussy | G06F 21/32 |
| 2019/0385086 A1 | 12/2019 | Wang et al. | |
| 2020/0257786 A1 | 8/2020 | Kim et al. | |
| 2022/0138480 A1* | 5/2022 | Jang | G06V 40/50 |
| | | | 382/115 |
| 2023/0073410 A1* | 3/2023 | Tussy | G06V 40/172 |

FOREIGN PATENT DOCUMENTS

| | | | |
|---|---|---|---|
| CN | 108573038 A | | 9/2018 |
| CN | 111460893 A | | 7/2020 |
| CN | 112148908 A | | 12/2020 |
| CN | 113870865 A | | 12/2021 |
| CN | 114417294 A | | 4/2022 |
| JP | 201912188 | * | 7/2019 |
| KR | 20190101841 | * | 2/2018 |
| TW | 202018541 A | | 5/2020 |
| WO | WO2020157575 A1 | | 8/2020 |
| WO | WO2021196892 A1 | | 10/2021 |

OTHER PUBLICATIONS

International Search Report and Written Opinion dated Jan. 4, 2023 for International Application No. PCT/CN2022/123997.

Notice of Registration dated Jan. 10, 2025 for Chinese Application No. 202210036515.1.

Yang Xiong "Identity Authentication System Based on FHE and Face Recognition in Cloud Environment" Journal of Guizhou University(Natural Sciences) vol. 36 No. 6, Dec. 2019.

Zhe-ming Huang et al. "Multi-objective Biogeography Optimization Algorithm Based on Dominance Degree Migration Model" Journal of East China University of Science and Technology (Natural Science Edition) vol. 44 No. 1, Feb. 2018, pp. 90-96.

* cited by examiner

METHOD, APPARATUS AND DEVICE FOR UPDATING FEATURE VECTOR DATABASE, AND MEDIUM

CROSS REFERENCE TO RELATED APPLICATION

The present application is a National Stage of International Application No. PCT/CN2022/123997 filed on Oct. 9, 2022, which claims priority to Chinese Patent Application No. 202210036515.1 filed on Jan. 13, 2022, and titled "METHOD, APPARATUS, AND DEVICE FOR UPDATING FEATURE VECTOR DATABASE, AND MEDIUM", both of which are hereby incorporated by reference in their entireties.

TECHNICAL FIELD

The present application belongs to the field of data processing, and particularly relates to a method, an apparatus, and a device for updating a feature vector database, and a medium.

BACKGROUND

A biological feature identification technique is a technique that performs personal identity verification using physiological or behavioral characteristics inherent in a human body. With the development of the biological feature identification technology, application fields of the biological feature identification technology are wider and wider, for example, the biological feature identification technology can be applied to payment, traffic, attendance, etc.

Under a condition that a network structure on which the biological feature identification technology depends changes or a biological feature identification algorithm needs to be optimized, an algorithm model for biological feature identification needs to be updated and upgraded. However, a feature vector of a biological feature obtained by an algorithm model of a different version is different, and a database of feature vectors corresponding to the algorithm model of a different version needs to be generated for the algorithm model of a different version.

At the present stage, original biological features when a user registered are stored, and when a database corresponding to the algorithm model of the different version needs to be generated, new feature vectors are generated using the original biological features, and then a new database is formed using the new feature vectors. However, the original biological feature belongs to the user's private data, and the security risk of storing the user's original biological feature is relatively great, that is, in the process of acquiring a feature vector required for the new database, a relatively great security risk will be brought to the user's private data.

SUMMARY

Embodiments of the present application provide a method, an apparatus, and a device for updating a feature vector database, and a medium.

In a first aspect, the embodiments of the present application provide a method for updating a feature vector database, including: acquiring a first biological feature in a service request; obtaining, according to the first biological feature, a first feature vector and a second feature vector respectively through a first algorithm model and a second algorithm model, wherein a version of the first algorithm model is different from a version of the second algorithm model, and the first algorithm model is configured with a first feature vector database including sample feature vectors obtained based on the first algorithm model; performing validity verification on the second feature vector according to an associated feature vector for a first user corresponding to a first sample feature vector, wherein the first sample feature vector is a sample feature vector successfully matched with the first feature vector in the first feature vector database, and the associated feature vector includes at least a portion of: the first feature vector, the second feature vector, and at least a portion of history feature vectors corresponding to the first algorithm model; and obtaining, under a condition that the validity verification on the second feature vector passes, a second sample feature vector for the first user based on the second feature vector, and storing the second sample feature vector in a second feature vector database, wherein the second algorithm model is configured with the second feature vector database.

In a second aspect, the embodiments of the present application provide an apparatus for updating a feature vector database, including: an acquisition module configured to acquire a first biological feature in a service request; a calculation module configured to obtain, according to the first biological feature, a first feature vector and a second feature vector respectively through a first algorithm model and a second algorithm model, wherein a version of the first algorithm model is different from a version of the second algorithm model, and the first algorithm model is configured with a first feature vector database including sample feature vectors obtained based on the first algorithm model; a validity verification module configured to perform validity verification on the second feature vector according to an associated feature vector for a first user corresponding to a first sample feature vector, wherein the first sample feature vector is a sample feature vector successfully matched with the first feature vector in the first feature vector database, and the associated feature vector includes at least a portion of the first feature vector, the second feature vector, and at least a portion of history feature vectors corresponding to the first algorithm model; and a processing module configured to obtain, under a condition that the validity verification on the second feature vector passes, a second sample feature vector for the first user based on the second feature vector, and store the second sample feature vector in a second feature vector database, wherein the second algorithm model is configured with the second feature vector database.

In a third aspect, the embodiments of the present application provide a device for updating a feature vector database, including: a processor and a memory storing computer program instructions; in which the computer program instructions, when executed by the processor, implements the method for updating the feature vector database according to the first aspect.

In a fourth aspect, the embodiments of the present application provide a computer-readable storage medium having computer program instructions stored thereon, wherein the computer program instructions, when executed by a processor, implements the method for updating the feature vector database according to the first aspect.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

DETAILED DESCRIPTION

Figure 1:
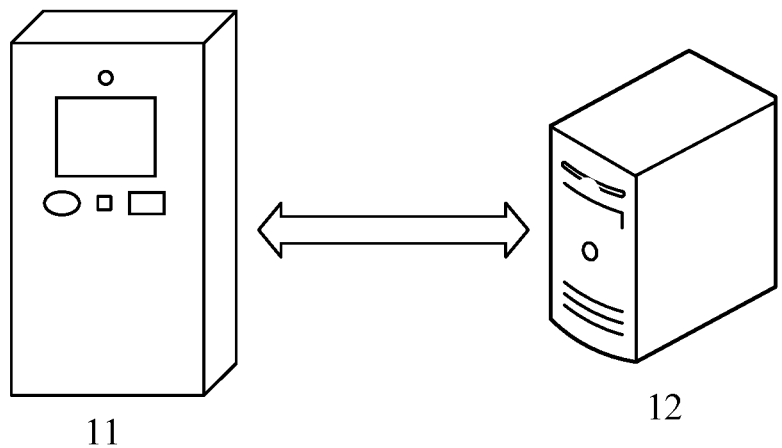
FIG. 1 shows a schematic diagram of an example of an application scenario of a method for updating a feature vector database according to an embodiment of the present application.

Features of various aspects and exemplary embodiments of the present application will be described in detail below. In order to make objects, technical solutions and advantages of the present application clearer, the present application is further described in detail below with reference to the drawings and specific embodiments. It should be understood that, specific embodiments described herein are merely for the illustration of the present application, not for limiting the present application. It will be apparent to a person skilled in the art that the present application can be practiced without some of these specific details. The following description of the embodiments is merely to provide a better understanding of the present application by illustrating examples of the present application.

A biological feature identification technique is a technique that performs personal identity verification using physiological or behavioral characteristics inherent in a human body. The application range of the biological feature identification technology is very wide, for example, the biological feature identification technology is applicable to the fields of payment, traffic, attendance, etc. Under a condition that a network structure on which the biological feature identification technology depends changes or the biological feature identification algorithm needs optimization, it is necessary to update and upgrade the algorithm model for biological feature identification, that is, an algorithm model of one version migrates to an algorithm model of another version. However, feature vectors of a biological feature obtained by algorithm models of different versions are different. For a same biological feature, a feature vector obtained by an algorithmic model of one version is very likely to be unusable in an algorithmic model of another version. In order to ensure that an updated and upgraded algorithm model can be used, corresponding feature vector databases can be generated for algorithm models of different versions. The feature vector in a feature vector database corresponding to the updated and upgraded algorithm model can be generated based on an original biological feature when the user is registered. However, in order to acquire the original biological feature when the user is registered, the original biological feature of the user needs to be stored after the user is registered. However, the original biological feature belongs to the user's private data, and the security risk of storing the user's original biological feature is relatively great, that is, in the process of acquiring feature vectors required for a new feature vector database, a relatively great security risk will be brought to the user's private data.

For convenience of illustration, the two algorithm models of different versions are referred to as a first algorithm model and a second algorithm model in the embodiments of the present application. A version of the first algorithm model is different from a version of the second algorithm model. The first algorithm model is an algorithm model originally used, the first algorithm model is configured with a first feature vector database, and the first feature vector database includes relatively complete sample feature vectors for the user. The sample feature vectors in the first feature vector database may serve as samples for identifying a user in a biological feature identification process using the first algorithmic model. The second algorithm model may be an algorithm model after migration. For example, the first algorithm model is an algorithm model before updating and upgrading, and the second algorithm model is an algorithm model after updating and upgrading. The second algorithmic model is configured with a second feature vector database. Sample feature vectors in the second feature vector database may serve as samples for identifying a user in a biological feature identification process using the second algorithmic model. The sample feature vectors in the second feature vector database can be obtained using the method for updating a feature vector database according to the embodiments of the present application. Before obtaining a second feature vector database corresponding to the second algorithmic model and including relatively complete sample features for the user, the biological feature identification may be performed using the first algorithmic model and the first feature vector database. After obtaining the second feature vector database corresponding to the second algorithmic model and including relatively complete sample features for the user, the biological feature identification can be performed using the second algorithm model and the second feature vector database.

The embodiments of the present application provides a method for updating a feature vector database, which can enable two different algorithm models for the biological feature identification technology to run in parallel. In this process, feature vectors are generated in real time according to a biological feature in a service request of a user, validity verification may be performed on feature vectors obtained by a algorithm model which is not completely online according to feature vectors obtained by the two different algorithm models, at least a portion of history feature vectors, and under a condition that the validity verification passes, the feature vectors are stored as the sample feature vectors for the user in a feature vector database which is not completed. In the process of obtaining the sample feature vectors in the feature vector database, it is not necessary to store an original biological feature registered for the user, so as to ensure that in the process of obtaining the sample feature vectors required for the feature vector database, risks will not be brought to the user's private data, and that the security of the user's private data is improved.

The method for updating a feature vector database according to the embodiments of the present application can be applied in the process of migration from an algorithm model which has not been updated and upgraded to an algorithm model which is updated and upgraded. FIG. 1 shows a schematic diagram of an example of an application scenario of a method for updating a feature vector database according to an embodiment of the present application. As shown in FIG. 1, the method for updating a feature vector database according to the embodiment of the present application may be related to a terminal device 11 and a server 12.

The terminal device 11 is a front-end device providing a biological feature identification service, and may collect a biological feature of a user. The terminal device 11 may interact with the server 12. In some examples, an algorithm model may be arranged in the terminal device 11, the terminal device 11 generates feature vectors according to the biological feature of the user and sends the feature vectors to the server 12, and the server 12 performs operations such as storage, matching, identification, and the like on the feature vectors. In some other examples, the terminal device 11 sends a collected biological feature of the user to the server 12, the server 12 generates feature vectors, and performs operations such as storage, matching, identification, and the like on the feature vectors.

The server 12 is a back-end device for performing biological feature identification, and can perform operations such as storage, matching, identification and the like on feature vectors generated based on a biological feature. In some examples, the server 12 may receive biological feature vectors generated by the terminal device 11 based on a biological feature of a user. In other examples, the server 12 may receive a biological feature of a user sent by the terminal device 11 and generate a corresponding feature vector according to the biological feature.

In some examples, the terminal device 11 and the server 12 may also be integrated into an apparatus or a system and implement the method for updating a feature vector database in the embodiment of the present application.

Figure 2:
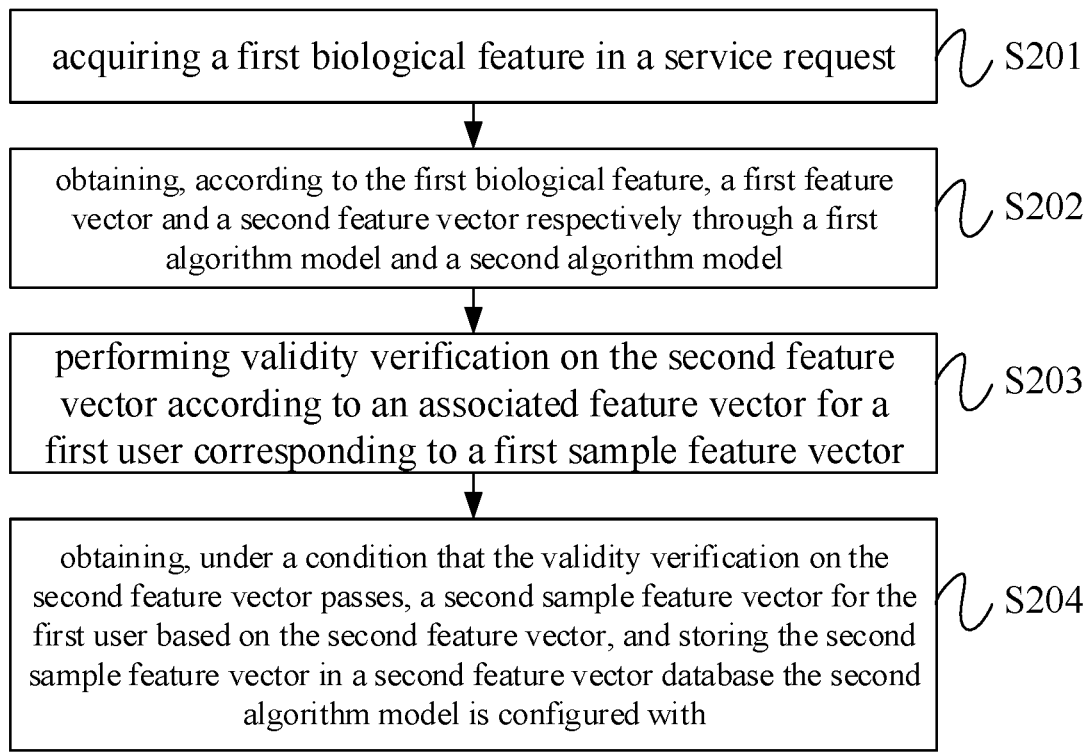
FIG. 2 shows a flowchart of an embodiment of a method for updating a feature vector database according to the present application.

The present application provides a method for updating a feature vector database, which can be applied in a scenario where a biological feature identification service migrates from an algorithm model of one version to an algorithm model of another version. The method for updating a feature vector database may be performed by an apparatus for a feature vector database, which is not limited herein. FIG. 2 shows a flowchart of an embodiment of a method for updating a feature vector database according to the present application. As shown in FIG. 2, the method for updating a feature vector database may include steps S201 to S204.

In step S201, a first biological feature in a service request is acquired.

In the process of migration from a first algorithm model to a second algorithm model, the first algorithm model and the second algorithm model run in parallel, and biological feature identification can be normally performed. Under a condition that the migration is not completed, the biological feature identification of a user can be performed using the first algorithmic model and the first feature vector database. In the process of migration from the first algorithm model to the second algorithm model, a first biological feature in a service request is acquired. The service request is a request for a service requiring biological feature identification, for example, the service request may include a payment service request, a traffic service request, an attendance service request, and the like, using biological feature identification, which is not limited herein.

In the embodiments of the present application, a type of the first biological feature is not limited. For example, the first biological feature may include a human face, a palm print, a fingerprint, an iris, a voice print, etc.

In step S202, according to the first biological feature, a first feature vector and a second feature vector are obtained respectively through a first algorithm model and a second algorithm model.

A version of the first algorithm model is different from a version of the second algorithm model. In the embodiment of the present application, the migration is from the first algorithm model to the second algorithm model, and correspondingly, the first algorithm model is an algorithm model before migration, and the second algorithm model is an algorithm model after migration. A first feature vector database is adapted to the first algorithm model. The first feature vector database includes sample feature vectors obtained based on the first algorithm model. The sample feature vectors are samples used for biological feature identification.

The first biological feature is inputted to the first algorithm model, and the first algorithm model can output a first feature vector corresponding to the first biological feature, that is, the first feature vector is a feature vector obtained based on the first algorithm model. Similarly, the first biological feature is inputted to the second algorithm model, and the second algorithm model outputs a second feature vector corresponding to the first biological feature, that is, the second feature vector is a feature vector obtained based on the second algorithm model.

In some embodiments, in order to ensure the security of biological feature identification of a user, bioassay detection may be performed on the user of the service request. In some examples, the first feature vector and the second feature vector may be obtained through the first algorithmic model and the second algorithmic model based on the first biological feature after the bioassay detection passes. In some other examples, validity verification of the second feature vector may be continued after the bioassay detection passes.

In step S203, validity verification is performed on the second feature vector according to an associated feature vector for a first user corresponding to a first sample feature vector.

The first sample feature vector is a sample feature vector successfully matched with the first feature vector in the first feature vector database. Specifically, after obtaining the first feature vector, a sample feature vector successfully matched with the first feature vector may be found in the first feature vector database. Two feature vectors successfully matched refers to that similarity between the two feature vectors is greater than or equal to a preset determination threshold value. The determination threshold value is a threshold value for determining that users indicated by the two feature vectors are a same user. The similarity between the two feature vectors is greater than or equal to the preset determination threshold value, that is, the two feature vectors are successfully matched, which indicates that the users indicated by the two feature vectors are a same user. The first feature vector database stores a corresponding relationship between a sample feature vector and a user, and a first user corresponding to the first sample feature vector may be determined according to the first sample feature vector.

The associated feature vector for the first user includes a feature vector obtained based on a biological feature of the first user. The associated feature vector includes at least a portion of: the first feature vector, the second feature vector, and at least a portion of history feature vectors corresponding to the first algorithm model. At least a portion of history feature vectors corresponding to the first algorithm model are at least a portion of history feature vectors obtained through the first algorithm model. Correspondingly, the associated feature vector for the first user includes at least a portion of: a first feature vector corresponding to the first biological feature, a second feature vector corresponding to the first biological feature, and at least a portion of history feature vectors for the first user generated by the first algorithm model.

It may be determined whether the second biological feature vector corresponding to the first biological feature is a valid feature vector for the first user, that is, the validity verification on the second feature vector is performed. If the validity verification passes, it indicates that the second biological feature vector corresponding to the first biological feature is a valid feature vector for the first user. If the validity verification does not pass, the second biological feature vector corresponding to the first biological feature may not be a valid feature vector for the first user, and further verification may be performed.

In some examples, the validity verification may include one or more of reliability verification, first difference verification, and second difference verification.

The reliability verification may be verification of the reliability of the second feature vector using a first feature vector generated according to a same biological feature. The first difference verification may be verification of an error difference between the second feature vector and the first feature vector using an error offset of the second algorithm model and an error offset of the first algorithm model. The second difference verification may be verification of an error difference of the second feature vector for the user itself using a plurality of second feature vectors obtained based on a plurality of service requests of the same user.

Under a condition that the validity verification includes one of the reliability verification, the first difference verification and the second difference verification, it is considered that the validity verification passes if the one verification. Under a condition that the validity verification includes the reliability verification, and the validity verification further includes at least one of the first difference verification and the second difference verification, the reliability verification may be performed firstly, and if the reliability verification does not pass, but at least one of the first difference verification and the second difference verification included in the validity verification passes, it may also be considered that the validity verification passes. Under a condition that the validity verification does not include the reliability verification, and the validity verification further includes at least one of the first difference verification and the second difference verification, it can be considered that the validity verification passes if the first difference verification and the second difference verification included in the validity verification.

The reliability verification, the first difference verification, and the second difference verification are illustrated in detail below.

For the reliability verification, the associated feature vector required includes the first feature vector and the history feature vectors corresponding to the first algorithm model. The history feature vectors corresponding to the first algorithm model for the first user are feature vectors for the first user generated through the first algorithm model before the first feature vector for the first user is generated this time. The reliability verification may include steps a1 and a2.

At step a1, first similarities between the first feature vector and the at least a portion of history feature vectors corresponding to the first algorithm model are calculated respectively.

At least a portion of history feature vectors corresponding to the first algorithm model may include N feature vectors generated through the first algorithm model for biological features in last N acquired service requests. N is a positive integer, and a value of N may be set according to scenarios, needs, experience and the like, which is not limited herein. For example, N may be 5.

The first similarities are similarities between the first feature vector and the history feature vectors. One first similarity may be calculated from the first feature vector and each of at least a portion of the history feature vectors. For example, if at least a portion of the history feature vectors corresponding to the first algorithm model includes five history feature vectors A1, A2, A3, A4 and A5, a first similarity between the first feature vector and the history feature vector A1, a first similarity between the first feature vector and the history feature vector A2, a first similarity between the first feature vector and the history feature vector A3, a first similarity between the first feature vector and the history feature vector A4 and a first similarity between the first feature vector and the history feature vector A5 can be calculated.

At step a2, it is determined that the reliability verification passes if none of the first similarities is less than a first determination threshold value.

The first determination threshold value is a threshold value for determining that a user corresponding to the first feature vector is a same user as a user corresponding to the historical feature vector, and can be set according to scenarios, needs, experience, and the like, which is not limited herein. If the first similarity is greater than or equal to the first determination threshold value, it represents that the user corresponding to the first feature vector is a same user as the user corresponding to the historical feature vector. If the first similarity is less than the first determination threshold value, it represents that the user corresponding to the first feature vector is not a same user as the user corresponding to the historical feature vector. In the embodiments of the present application, under a condition that all the first similarities are greater than or equal to the first determination threshold value, it is determined that the reliability verification passes.

If a first similarity being less than the first determination threshold value exists, it is determined that the reliability verification does not pass.

An associated feature vector required for the first difference verification includes the first feature vector and the second feature vector. The first difference verification may include steps b1 and b2.

At step b1, a maximum angle among a plurality of second feature vectors is calculated using the plurality of second feature vectors obtained based on a plurality of service requests of the first user.

Under a condition that each time the second feature vector is obtained through the second algorithm model according to the biological feature in the service request of the first user, the second feature vector may be cached, and when a number of the second feature vectors for a same user reaches a number required for verification, an angle between every two second feature vectors is calculated using second feature vectors for which a number reaches the number required for verification, and a maximum angle is selected from a plurality of angles.

Figure 3:
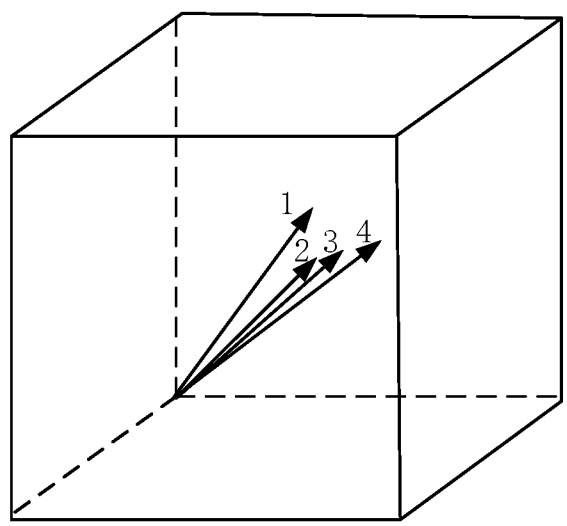
FIG. 3 shows a schematic diagram of an example of an angle of a feature vector in a high-dimensional space according to an embodiment of the present application.
Figure 4:
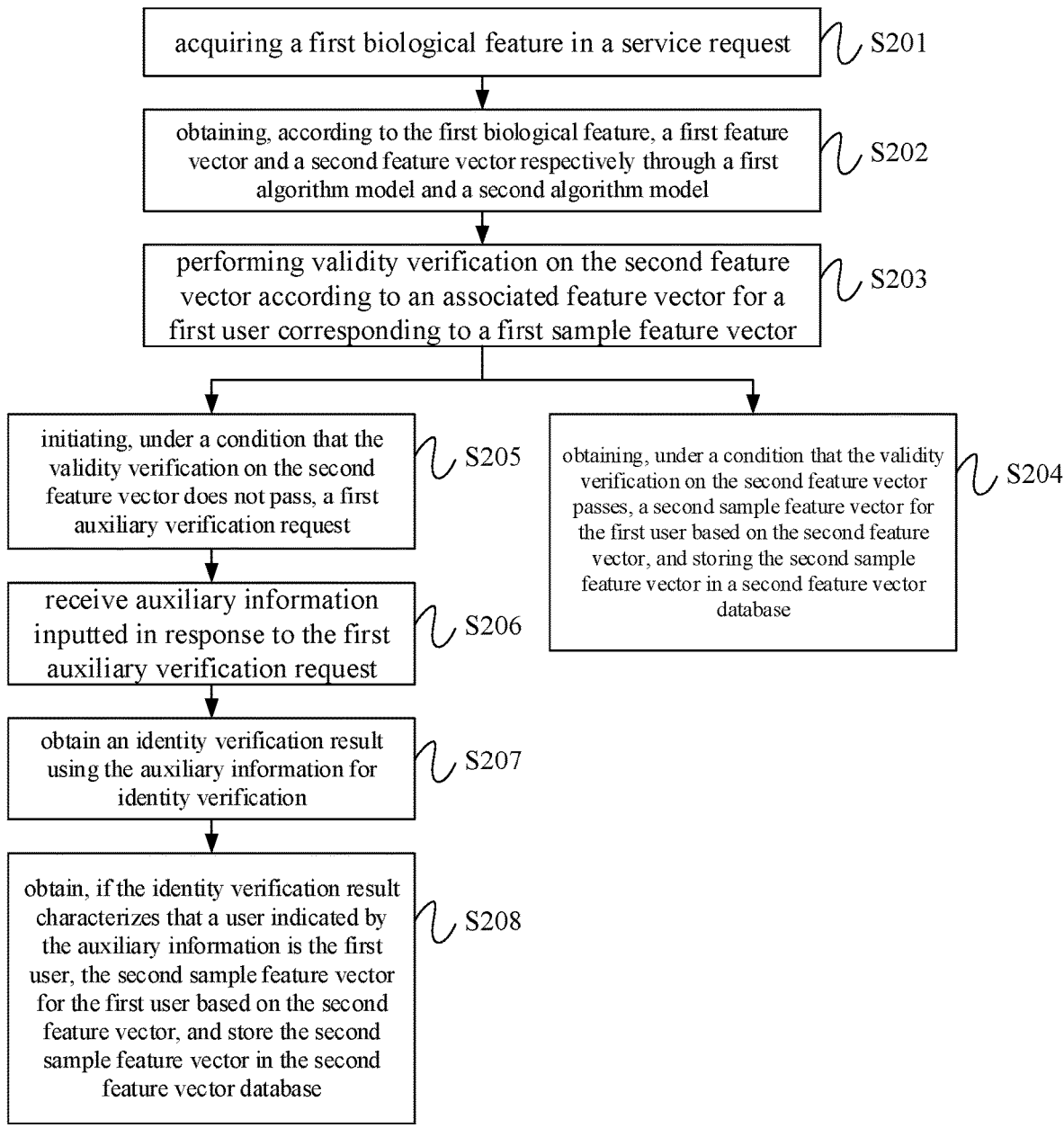
FIG. 4 shows a flowchart of another embodiment of a method for updating a feature vector database according to the present application.

FIG. 3 shows a schematic diagram of an example of an angle of a feature vector in a high-dimensional space according to an embodiment of the present application. FIG. 3 shows four feature vectors, which are feature vectors 1, 2, 3, and 4, respectively. As shown in FIG. 4, an angle exists between every two of the feature vectors 1, 2, 3, and 4, in which the maximum angle among the plurality of feature vectors is an angle between the feature vectors 1 and 4.

In order to calculate an angle between two feature vectors, the cosine of the angle between the two feature vectors may be calculated firstly, and then the angle is calculated according to the cosine of the angle. For example, the cosine of the angle between the two feature vectors may be calculated according to the following equation (1):

$$\cos\langle \vec{a}, \vec{b}\rangle = \frac{\vec{a}\vec{b}}{|\vec{a}||\vec{b}|} \qquad (1)$$

in which $\vec{a}$ is a feature vector; $\vec{b}$ is another feature vector; $\cos\langle \vec{a}, \vec{b}\rangle$ is the cosine of the angle between the feature vector $\vec{a}$ and the feature vector $\vec{b}$; $|\vec{a}|$ is a modulus of the feature vector $\vec{a}$; $|\vec{b}|$ is a modulus of the feature vector $\vec{b}$.

At step b2, a maximum angle among a plurality of first feature vectors is calculated using the plurality of first feature vectors obtained based on the plurality of service requests of the first user.

Under a condition that each time the first feature vector is obtained through the first algorithm model according to the biological feature in the service request of the first user, the first feature vector may be cached, and when a number of the first feature vectors for a same user reaches a number required for verification, an angle between every two first feature vectors is calculated using first feature vectors for which the number reaches the number required for verification, and a maximum angle is selected from a plurality of angles.

For calculation of the angle between the first feature vectors, reference may be made to relevant contents of calculation of the angle between the feature vectors and the cosine of the angle described above and is not repeated herein.

At step b3, it is determined that the first difference verification passes if the maximum angle among the plurality of second feature vectors is less than the maximum angle among the plurality of first feature vectors.

Since the second algorithm model is an algorithm model after migration, that is, the version of the second algorithm model is higher than the version of the first algorithm model, the difference fluctuation among the second feature vectors obtained by the second algorithm model for the same user should be less than the difference fluctuation among the first feature vectors obtained by the first algorithm model for the same user, so as to control an error of the second algorithm model within an error of the first algorithm model. An angle between different feature vectors may reflect the difference fluctuation between different feature vectors, and by comparing a maximum angle among the second feature vectors with a maximum angle among the first feature vectors, it may be determined whether the error of the second algorithm model is within the error of the first algorithm model. If the maximum angle among the second feature vectors is less than the maximum angle among the first feature vectors, it represents that the error of the second algorithm model is within the error of the first algorithm model, and it is considered that the first difference verification passes. If the maximum angle among the second feature vectors is greater than the maximum angle among the first feature vectors, it represents that the error of the second algorithm model is beyond the error of the first algorithm model, and it is considered that the first difference verification does pass.

An associated feature vector required for the second difference verification includes the second feature vector. The second difference verification may include steps c1 to c3.

At step c1, a plurality of second feature vectors obtained based on a plurality of service requests of the first user are acquired.

Under a condition that each time the second feature vector is obtained through the second algorithm model according to the biological feature in the service request of the first user, the second feature vector may be cached, and a plurality of second feature vectors corresponding to the first user.

At step c2, second similarities between every two of the plurality of second feature vectors are calculated respectively.

Under a condition that a number of acquired second feature vectors corresponding to the first user reaches a certain number, similarities between every two of the second feature vectors for which the number reaches the certain number are calculated. The second similarities are similarities between every two of the plurality of second feature vectors. For example, if the plurality of second feature vectors include second feature vectors B1, B2 and B3, a similarity between the second feature vectors B1 and B2, a similarity between the second feature vectors B1 and B3, and a similarity between the second feature vectors B2 and B3 can be calculated.

At step c3, it is determined that the second difference verification passes if none of the second similarities is less than a second determination threshold value.

The second determination threshold value is a threshold value for determining that whether differences among the plurality of second feature vectors are within an acceptable range, and can be set according to scenarios, needs, experience, and the like, which is not limited herein. If a second similarity between two second feature vectors is greater than or equal to the second determination threshold value, it represents that a difference between the two second feature vectors is within the acceptable range. If the second similarity between the two second feature vectors is less than the second determination threshold value, it represents that the difference between the two second feature vectors is relatively great and not within the acceptable range, which may be resulted from a problem in the collected biological feature or fluctuation in the second algorithm model. In the embodiments of the present application, under a condition that all the second similarities are greater than or equal to the second determination threshold value, it is determined that the second difference verification passes.

In step S204, a second sample feature vector for the first user, under a condition that the validity verification on the second feature vector passes, is obtained based on the second feature vector, and the second sample feature vector is stored in a second feature vector database the second algorithm model is configured with.

The validity verification on the second feature vector passes, which represents that the second feature vector is valid, and the second sample feature vector can be obtained according to the second feature vector. The second sample feature vector may be stored in the second feature vector database as a sample feature vector for the first user in the second feature vector database.

In some examples, the second feature vector may be determined directly as the second sample feature vector. For example, the validity verification includes the reliability verification, and under a condition that the reliability verification passes, a second feature vector corresponding to the first feature vector can be directly determined as the second sample feature vector for the first user.

In some examples, an average vector of the plurality of second feature vectors obtained based on the plurality of service requests of the first user may be calculated, and the average vector may be determined as the second sample feature vector. The calculation of the average vector of the plurality of second feature vectors is the same as the calculation of the average vector of the plurality of feature vectors, and the average vector of the feature vectors can be calculated according to the following equations (2) to (4):

$$X_i = (x_{i1}, x_{i2}, \ldots, x_{ip})^T, i = 1, 2, \ldots, N \quad (2)$$

$$\overline{x}_j = \frac{1}{N} \sum_{i=1}^{N} x_{ij}, i = 1, 2, \ldots, p \quad (3)$$

$$\overline{X} = (\overline{x}_1, \overline{x}_2, \ldots, \overline{x}_p)^T \quad (4)$$

wherein $X_i$ is the $i^{th}$ feature vector; $x_{i1}$ is the first element in the $i^{th}$ feature vector; $x_{ip}$ is the $p^{th}$ element in the $i^{th}$ feature vector; $\overline{X}$ is an average vector; and $\overline{x}_j$ is the $j^{th}$ element in the average vector.

For example, under a condition that the validity verification includes the first difference verification and/or the second difference verification, the average vector of the plurality of second feature vectors obtained based on the plurality of service requests of the first user may be determined as the second sample feature vector for the first user under a condition that the validity verification passes.

In yet some other examples, a second feature vector last acquired in the plurality of second feature vectors obtained from the plurality of service requests of the first user may be determined as the second sample feature vector. For example, under a condition that the validity verification includes the first difference verification and/or the second difference verification, a second feature vector last acquired in the plurality of second feature vectors obtained based on the plurality of service requests of the first user may be determined as the second sample feature vector for the first user under a condition that the validity verification passes.

The steps S201 to S204 may be repeated until users corresponding to sample feature vectors in the second feature vector database are complete or tend to be complete, that is, the update of the feature vector database is completed, and the migration is from the first feature vector database to the second feature vector database.

In the embodiments of the present application, in the process of two algorithm models of different versions running in parallel, the first feature vector may be generated in real time through the first algorithm model and the second feature vector may be generated in real time through the second algorithm model according to the biological feature in the service request of the user. According to at least a portion of the first feature vector, the second feature vector, and the historical feature vectors, the validity verification can be performed on a feature vector obtained by an algorithm model which is not completely online in the two algorithm models, namely, the second algorithm model, and under a condition that the validity verification passes, the feature vector is stored as a sample feature vector for the user in the feature vector database which is not completed, namely, the second feature vector database. In the process of obtaining the sample feature vectors in the second feature vector database, it is not necessary to store an original biological feature registered for the user, so as to ensure that in the process of obtaining the sample feature vectors required for the feature vector database, risks will not be brought to the user's private data, and that the security of the user's private data is improved.

In the above-mentioned process, the user is not aware of the updating of the feature vector database, the updating of the feature vector database may be completed without disturbing the user and increasing the user's operations, the migration of the sample feature vectors is implemented, and user experience is improved.

Through the validity verification, such as the reliability verification, the first difference verification and the second difference verification, the accuracy of the sample feature vectors in the updated feature vector database, i.e. the second feature vector database, can be ensured.

Moreover, certain biological features of the user may change over time. In the related art of storing an original biological feature registered for a user and obtaining sample feature vectors for biological feature identification according to the original biological feature, misidentification may exists. For example, biological feature identification on a user is performed using a human face feature, but the user is a teenager, and due to the developmental changes of the teenager, a human face feature of the teenager differs greatly from an original human face feature used for registration, and thus a problem in the biological feature identification is caused. In the embodiments of the present application, a sample feature vector used for biological feature identification in a feature vector database is obtained according to a feature vector of a biological feature in a service request of a user, and the service request of the user is a service request that occurs recently, so that misidentification resulted from data used for biological feature identification in the feature vector database being too old is avoided, and thus the accuracy of biological feature identification is increased.

In some embodiments, the service request may be a service request in which the user is a known user and 1:1 biological feature identification is required, such as a registration service request and a log-in service request, in addition to a service request in which the user is an unknown user and 1:N biological feature identification is required. Under a condition that a user of the service request is a known user, and if the first feature vector is successfully matched with a sample feature vector for the known user in the first feature vector database, the second feature vector is stored in the second feature vector database as a sample feature vector for the known user in the second feature vector database.

Since a user with a service request in which 1:1 biological feature identification is performed is a known user, a biological feature in the service request may be considered as a reliable and valid biological feature, and similarly, a first feature vector obtained based on the biological feature in the service request under this condition is successfully matched, and then it can be ensured that a second feature vector obtained based on the biological feature in the service request is reliable and valid, and the second feature vector can be directly added to second feature vector database as a sample feature vector for the known user.

In some examples, a bioassay detection may be performed on the known user to further ensure the security of the biological feature identification of the known user, and under a condition that the bioassay detection passes and the first feature vector is successfully matched with the sample feature vector for the known user in the first feature vector database, the second feature vector is then stored in the second feature vector database.

In some examples, if the validity verification does not pass, it can be determined through an auxiliary operation whether the second sample feature vector may be used as the sample feature vector in the second feature vector database. FIG. 4 shows a flowchart of another embodiment of a method for updating a feature vector database according to the present application. FIG. 4 differs from FIG. 2 in that the method for updating a feature vector database shown in FIG. 4 may further include steps S205 to S208.

In step S205, a first auxiliary verification request, under a condition that the validity verification on the second feature vector does not pass, is initiated.

The first auxiliary verification request may be used to prompt the user to input auxiliary information.

In step S206, auxiliary information inputted in response to the first auxiliary verification request is received.

The auxiliary information may be used to assist in determining the validity of the second feature vector. The auxiliary information may specifically include information for identity verification. In some examples, the auxiliary information includes one or more of a text message verification code, a user terminal token, user identity information and a second biological feature.

The user terminal token is a dynamic password for performing identity verification. The user identity information may include a mobile phone number of the user, a mail address of the user, and the like, which is not limited herein. A type of the second biological feature is different from a type of the first biological feature. For example, the first biological feature is a human face, and the second biological feature is a palm print. For another example, the first biological feature is a human face, and the second biological feature is a voice print.

In step S207, an identity verification result is obtained by using the auxiliary information for identity verification.

The identity verification result may characterize whether a user indicated by the auxiliary information is the first user.

For example, the auxiliary information includes the text message verification code and/or the user terminal token, and the identity authentication result may be generated according to whether a text message verification code and/or user terminal token received is consistent with a text message verification code and/or user terminal token sent to the first user. If they are consistent, the identity verification result characterizes that the user indicated by the auxiliary information is the first user; and if they are not consistent, the identity verification result characterizes that the user indicated by the auxiliary information is not the first user.

For another example, the auxiliary information includes the user identity information, and the identity verification result may be generated according to whether the user identity information is consistent with registration information of the first user. If they are consistent, the identity verification result characterizes that the user indicated by the auxiliary information is the first user; and if they are not consistent, the identity verification result characterizes that the user indicated by the auxiliary information is not the first user.

For yet another example, the auxiliary information includes the second biological feature, and the identity verification result may be generated according to whether a user obtained using the second biological feature for biological feature identification is the first user. If the user obtained using the second biological feature for biological feature identification is the first user, the identity verification result characterizes that the user indicated by the auxiliary information is the first user; and if the user obtained using the second biological feature for biological feature identification is not the first user, the identity verification result characterizes that the user indicated by the auxiliary information is not the first user.

In step S208, if the identity verification result characterizes that a user indicated by the auxiliary information is the first user, the second sample feature vector for the first user is obtained based on the second feature vector, and the second sample feature vector is stored in the second feature vector database the second algorithm model is configured with.

The identity verification result characterizes that the user indicated by the auxiliary information is the first user, which represents that the second feature vector has validity, and based on the second feature vector, a feature vector stored in the second feature vector database as a sample feature vector for the first user can be obtained.

Figure 5:
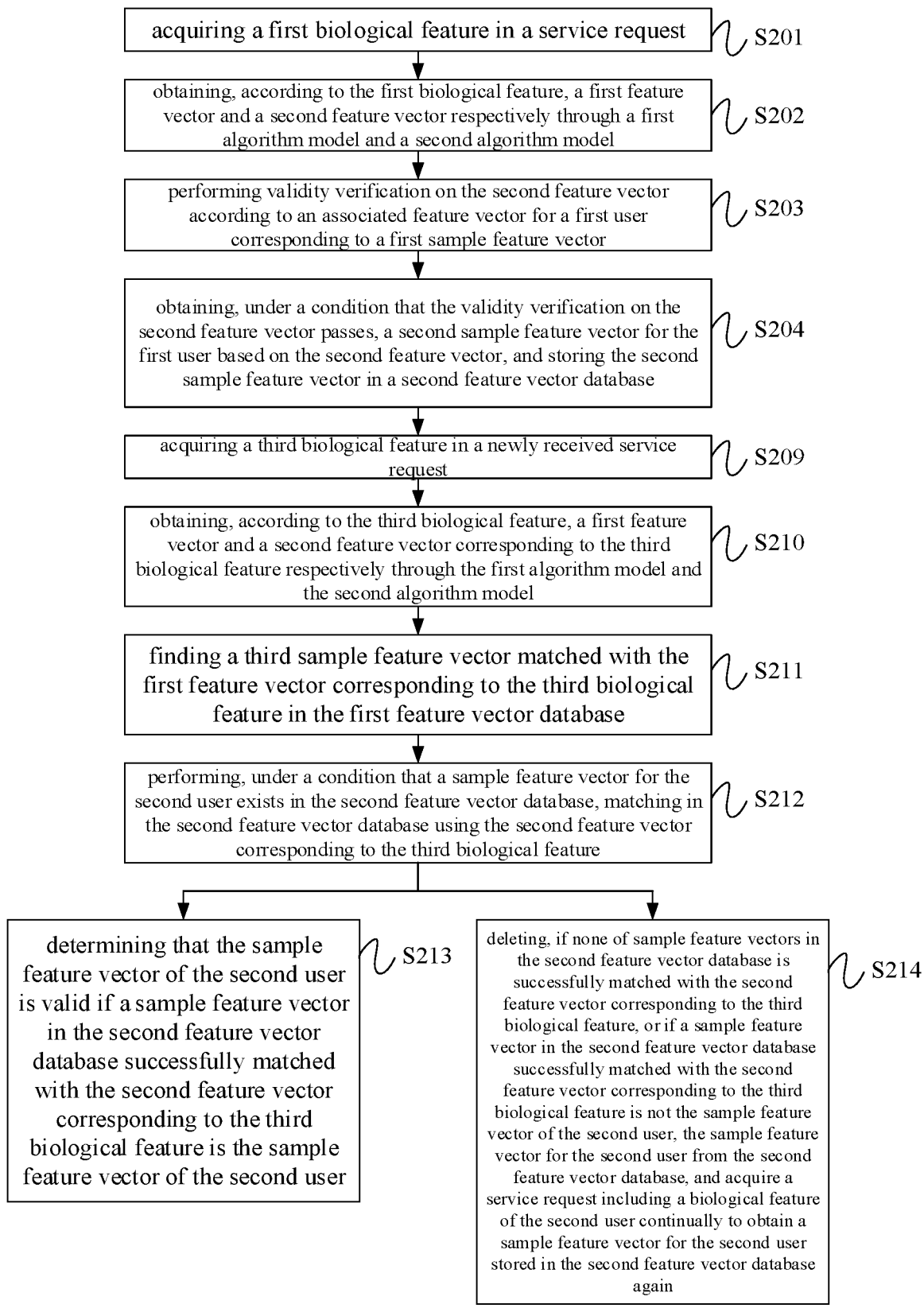
FIG. 5 shows a flowchart of yet another embodiment of a method for updating a feature vector database according to the present application.

In some embodiments, after the second sample feature vector obtained based on the second feature vector is stored in the second feature vector database, the validity of the second sample feature vector can be further verified and updated in time under a condition that a service request is acquired subsequently. FIG. 5 shows a flowchart of yet another embodiment of a method for updating a feature vector database according to the present application. FIG. 5 differs from FIG. 2 in that the method for updating a feature vector database shown in FIG. 5 may further include steps S209 to S214.

In step S209, a third biological feature in a newly received service request is acquired.

The third biological feature is a biological feature in the newly received service request. A type of the third biological feature is the same as the type of the first biological feature.

In step S210, a first feature vector and a second feature vector corresponding to the third biological feature, according to the third biological feature, are obtained respectively through the first algorithm model and the second algorithm model.

According to the third biological feature and through the first algorithm model, the first feature vector corresponding to the third biological feature is obtained. According to the third biological feature and through the second algorithm model, the second feature vector corresponding to the third biological feature is obtained.

In step S211, a third sample feature vector matched with the first feature vector corresponding to the third biological feature is found in the first feature vector database, and a second user corresponding to the third sample feature vector is determined.

Similarity between the third sample feature vector and the first feature vector corresponding to the third biological feature is greater than a preset determination threshold value. According to the first feature vector corresponding to the third biological feature, biological feature identification is performed using the first feature vector database, and the second user is a user identified in the biological feature identification performed in the first feature vector database.

In step S212, under a condition that a sample feature vector for the second user exists in the second feature vector database, matching is performed in the second feature vector database using the second feature vector corresponding to the third biological feature.

If the sample feature vector for the second user exists in the second feature vector database, 1:N biological feature identification may be performed in the second feature vector database using the second feature vector corresponding to the third biological feature, that is, matching is performed in the second feature vector database using the second feature vector corresponding to the third biological feature, to verify the validity of the sample feature vector for the second user stored in the second feature vector database.

In step S213, if a sample feature vector in the second feature vector database successfully matched with the second feature vector corresponding to the third biological feature is the sample feature vector for the second user, it is determined that the sample feature vector for the second user is valid.

The second feature vector corresponding to the third biological feature is successfully matched with the sample feature vector for the second user in the second feature vector database, which represents that the 1:N biological feature identification performed using the second feature vector corresponding to the third biological feature is successful and correct, and it can be determined that the sample feature vector for the second user in the second feature vector database is valid.

In step S214, if none of sample feature vectors in the second feature vector database is successfully matched with the second feature vector corresponding to the third biological feature, or if a sample feature vector in the second feature vector database successfully matched with the second feature vector corresponding to the third biological feature is not the sample feature vector of the second user, the sample feature vector for the second user is deleted from the second feature vector database, and a service request including a biological feature of the second user is acquired continually to obtain a sample feature vector for the second user stored in the second feature vector database again.

None of the sample feature vectors in the second feature vector database is successfully matched with the second feature vector corresponding to the third biological feature, which represents the 1:N biological feature identification performed using the second feature vector corresponding to the third biological feature fails, and it can be determined that the sample feature vector for the second user in the second feature vector database is not valid.

The second feature vector corresponding to the third biological feature is not successfully matched with the sample feature vector for the second user in the second feature vector database, which represents that the 1:N biological feature identification performed using the second feature vector corresponding to the third biological feature is incorrect, and it can be determined that the sample feature vector for the second user in the second feature vector database is not valid.

Under a condition that the sample feature vector for the second user in the second feature vector database is not valid, the sample feature vector for the second user is deleted from the second feature vector database, and relevant steps in steps S201 to S208 in the above-mentioned embodiment may be performed again, to obtain a new sample feature vector for the second user stored in the second feature vector database.

Figure 6:
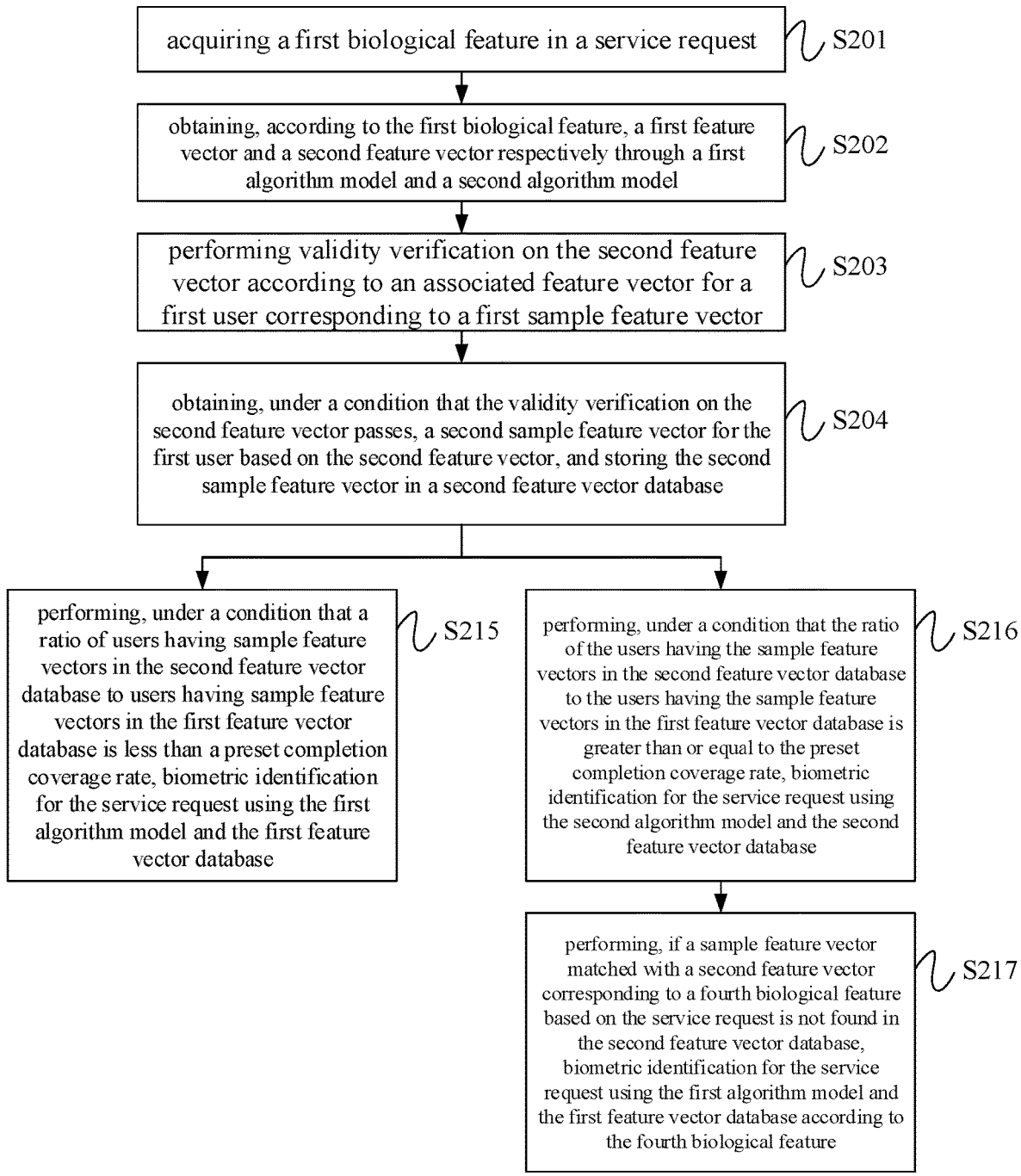
FIG. 6 shows a flowchart of yet another embodiment of a method for updating a feature vector database according to the present application.

In some embodiments, according to a number of users for sample feature vectors in the second feature vector database, it may be determined whether to launch the second algorithm model completely and end the migration from the first algorithm model to the second algorithm model. FIG. 6 shows a flowchart of yet another embodiment of a method for updating a feature vector database according to the present application. FIG. 6 differs from FIG. 2 in that the method for updating a feature vector database shown in FIG. 6 may further include steps S215 to S217.

In step S215, under a condition that a ratio of users having sample feature vectors in the second feature vector database to users having sample feature vectors in the first feature vector database is less than a preset completion coverage rate, biological feature identification for the service request is performed using the first algorithm model and the first feature vector database.

The preset completion coverage rate is a threshold value for determining whether users corresponding to the first feature vector database are substantially migrated to the second feature vector database, which may be set according to scenarios, needs, experience, and the like, which is not limited herein.

The ratio of the users having the sample feature vectors in the second feature vector database to the users having the sample feature vectors in the first feature vector database is a real-time coverage rate. The real-time coverage rate is less than the preset completion coverage rate, which represents that a number of the users having the sample feature vectors in the second feature vector database is not sufficient to support biological feature identification services. Under this condition, biological feature identification for the service request is still performed using the first algorithmic model and the first feature vector database.

In some examples, under a condition that the validity verification needs to be performed according to the plurality of second feature vectors in the above-mentioned embodiment, if a number of second feature vectors does not reach a number required for verification, a sample feature vector for a third user corresponding to the second feature vector in the first feature vector database may be kept. Under a condition that the third user initiates a service request, biological feature identification for the service request is performed using the first algorithm model and the first feature vector database, to avoid the condition that the service request of the third user can not be performed when a sample feature vector for the third user is not stored in the second feature vector database.

In step S216, under a condition that the ratio of the users having the sample feature vectors in the second feature vector database to the users having the sample feature vectors in the first feature vector database is greater than or equal to the preset completion coverage rate, biological feature identification for the service request is performed using the second algorithm model and the second feature vector database.

The real-time coverage rate is greater than or equal to the preset completion coverage rate, which represents that the number of the users having the sample feature vectors in the second feature vector database is sufficient to support the biological feature identification services. Under this condition, biological feature identification for the service request may be performed using the second algorithmic model and the second feature vector database.

For example, the preset completion coverage rate is 98%. When the real-time coverage rate is less than 98%, a service request of a user is received, and biological feature identification is still performed using the first algorithm model and the first feature vector database; and when the real-time coverage rate is greater than or equal to 98%, biological feature identification may be performed using the second algorithm model and the second feature vector database.

In step S217, if a sample feature vector matched with a second feature vector corresponding to a fourth biological feature in the service request is not found in the second feature vector database, biological feature identification for the service request is performed using the first algorithm model and the first feature vector database according to the fourth biological feature.

The fourth biological feature is a biological feature in the service request, and a type of the fourth biological feature is the same as the type of the first biological feature.

In the process of perform biological feature identification using the second algorithm model and the second feature vector database, the condition that a matched sample feature vector is not identified may occur, in which the service request may be initiated by a service low-frequency user, and since an activity frequency of the service low-frequency user is relatively low, in the process of the migration of the feature vector database, a second sample feature vector for the service low-frequency user is not obtained, that is, the second sample feature vector for the service low-frequency user is not stored in the second feature vector database. Under this condition, in order to realize biological feature identification of the service low-frequency user, biological feature identification for the service request can be performed on the service low-frequency user using the first algorithm model and the first feature vector database, so as to ensure the completeness of biological feature identification.

In some examples, if a sample feature vector matched with the second feature vector corresponding to the fourth biological feature in the service request is not found in the second feature vector database, a second auxiliary verification request may be initiated. Auxiliary information inputted in response to the second auxiliary verification request is received, and identify verification on a third user obtained by performing biological feature identification according to the fourth biological feature is performed using the auxiliary information to obtain an identity verification result. If the identity verification result characterizes that a user indicated by the auxiliary information is the third user, a third sample feature vector obtained based on the second feature vector corresponding to the fourth feature vector is stored in the second feature vector database as a sample feature vector for the third user in the second feature vector database.

The second auxiliary verification request may be used to prompt the user to input auxiliary information. For details of the auxiliary information, the identify verification, the identity verification result, and the like, reference may be made to relevant illustrations in the above-mentioned embodiment and is not repeated herein.

The identity verification result characterizes that the user indicated by the auxiliary information is the third user, which represents that the second feature vector corresponding to the fourth biological feature has validity, and based on the second feature vector corresponding to the fourth biological feature, a feature vector stored in the second feature vector database as a sample feature vector for the third user can be obtained.

Figure 7:
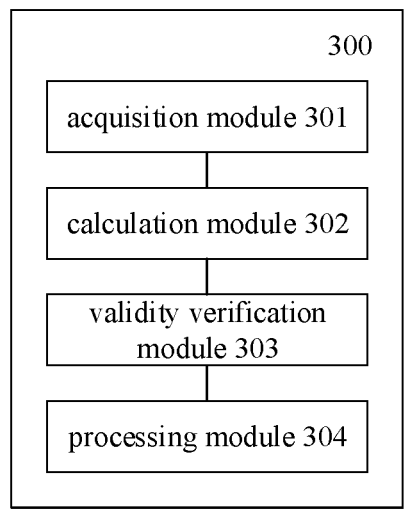
FIG. 7 shows a schematic structural diagram of an embodiment of an apparatus for updating a feature vector database according to the present application.

The present application also provides an apparatus for updating a feature vector database, which can be implemented as a server and/or a front-end device, and is not limited herein. FIG. 7 shows a schematic structural diagram of an embodiment of an apparatus for updating a feature vector database according to the present application. As shown in FIG. 7, the apparatus 300 for updating a feature vector database may include an acquisition module 301, a calculation module 302, a validity verification module 303, and a processing module 304.

The acquisition module 301 may be configured to acquire a first biological feature in a service request.

The calculation module 302 may be configured to obtain, according to the first biological feature, a first feature vector and a second feature vector respectively through a first algorithm model and a second algorithm model.

A version of the first algorithm model is different from a version of the second algorithm model. The first algorithmic model is configured with a first feature vector database. The first feature vector database includes sample feature vectors obtained based on the first algorithm model.

The validity verification module 303 may be configured to perform validity verification on the second feature vector according to an associated feature vector of a first user corresponding to a first sample feature vector.

The first sample feature vector is a sample feature vector successfully matched with the first feature vector in the first feature vector database. The associated feature vector includes at least a portion of: the first feature vector, the second feature vector, and at least a portion of history feature vectors corresponding to the first algorithm model.

In some embodiments, the validity verification may include one or more of: reliability verification, first difference verification, and second difference verification.

The validity verification includes the reliability verification, and correspondingly, the associated feature vector includes the first feature vector and the history feature vectors corresponding to the first algorithm model.

The validity verification module 303 may perform the reliability verification. Specifically, the validity verification module 303 may be configured to: calculate first similarities between the first feature vector and at least a portion of history feature vectors corresponding to the first algorithm model respectively; and if none of the first similarities is less than the first determination threshold value, determine that the reliability verification passes.

The validity verification includes the first difference verification, and correspondingly, the associated feature vector includes the first feature vector and the second feature vector.

The validity verification module 303 may perform the first difference verification. Specifically, the validity verification module 303 may be configured to: calculate a maximum angle among a plurality of second feature vectors using the plurality of second feature vectors obtained based on a plurality of service requests of the first user; calculate a maximum angle among a plurality of first feature vectors using the plurality of first feature vectors obtained based on the plurality of service requests of the first user; and determined that the first difference verification passes if the maximum angle among the plurality of second feature vectors is less than the maximum angle among the plurality of first feature vectors.

The validity verification includes the second difference verification, and correspondingly, the associated feature vector includes the second feature vector.

The validity verification module 303 may perform the second difference verification. Specifically, the validity verification module 303 may be configured to: acquire a plurality of second feature vectors obtained based on a plurality of service requests of the first user; calculate second similarities between every two of the plurality of second feature vectors respectively; and determine that the second difference verification passes if none of the second similarities is less than a second determination threshold value.

The processing module 304 may be configured to obtain, under a condition that the validity verification on the second feature vector passes, a second sample feature vector for the first user based on the second feature vector, and store the second sample feature vector in a second feature vector database the second algorithm model is configured with.

Specifically, the processing module 304 may be configured to determine the second feature vector as the second sample feature vector, or calculate an average vector of the plurality of second feature vectors obtained based on the plurality of service requests of the first user, and determined the average vector as the second sample feature vector, or determine a second feature vector last acquired in the plurality of second feature vectors obtained based on the plurality of service requests of the first user as the second sample feature vector.

In the embodiments of the present application, in the process of two algorithm models of different versions running in parallel, the first feature vector may be generated in real time through the first algorithm model and the second feature vector may be generated in real time through the second algorithm model according to the biological feature in the service request of the user. According to at least a portion of the first feature vector, the second feature vector, and the historical feature vectors, the validity verification can be performed on a feature vector obtained by an algorithm model which is not completely online in the two algorithm models, namely, the second algorithm model, and under a condition that the validity verification passes, the feature vector is stored as a sample feature vector for the user in the feature vector database which is not completed, namely, the second feature vector database. In the process of obtaining the sample feature vectors in the second feature vector database, it is not necessary to store an original biological feature registered for the user, so as to ensure that in the process of obtaining the sample feature vectors required for the feature vector database, risks will not be brought to the user's private data, and that the security of the user's private data is improved.

In the above-mentioned process, the user is not aware of the updating of the feature vector database, the updating of the feature vector database may be completed without disturbing the user and increasing the user's operations, the migration of the sample feature vectors is implemented, and user experience is improved.

Through the validity verification, such as the reliability verification, the first difference verification and the second difference verification, the accuracy of the sample feature vectors in the updated feature vector database, i.e. the second feature vector database, can be ensured.

Moreover, certain biological features of the user may change over time. In the related art of storing an original biological feature registered for a user and obtaining sample feature vectors for biological feature identification according to the original biological feature, misidentification may exists. For example, biological feature identification on a user is performed using a human face feature, but the user is a teenager, and due to the developmental changes of the teenager, a human face feature of the teenager differs greatly from an original human face feature used for registration, and thus a problem in the biological feature identification is caused. In the embodiments of the present application, a sample feature vector used for biological feature identification in a feature vector database is obtained according to a feature vector of a biological feature in a service request of a user, and the service request of the user is a service request that occurs recently, so that misidentification resulted from data used for biological feature identification in the feature vector database being too old is avoided, and thus the accuracy of biological feature identification is increased.

In some embodiments, under a condition that a user of the service request is a known user, and if the first feature vector is successfully matched with a sample feature vector for the known user in the first feature vector database, the second feature vector is stored in the second feature vector database as a sample feature vector for the known user in the second feature vector database.

Figure 8:
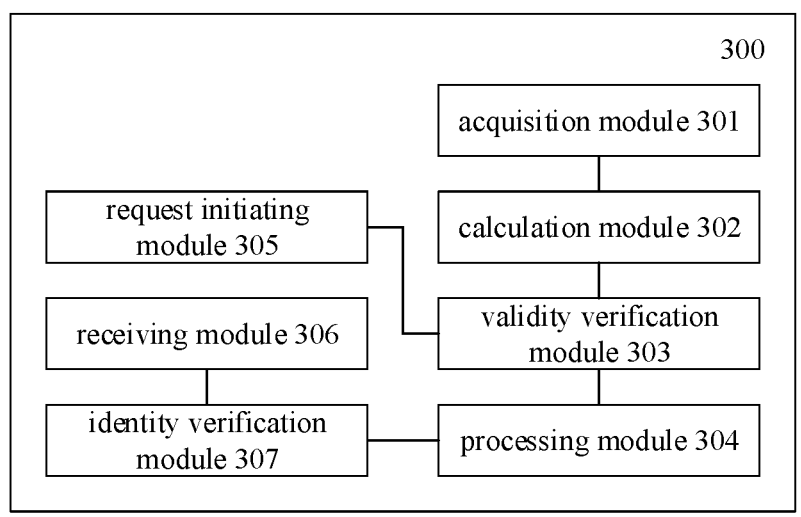
FIG. 8 shows a schematic structural diagram of another embodiment of an apparatus for updating a feature vector database according to the present application.

In some embodiments, under a condition that the validity verification does not pass, the validity of the second feature vector may also be confirmed cooperatively using the auxiliary information. FIG. 8 shows a schematic structural diagram of another embodiment of an apparatus for updating a feature vector database according to the present application. FIG. 8 differs from FIG. 7 in that the apparatus 300 for updating a feature vector database shown in FIG. 8 may further include a request initiating module 305, a receiving module 306, and an identity verification module 307.

The request initiating module 305 may be configured to initiate, under a condition that the validity verification on the second feature vector does not pass, a first auxiliary verification request.

The receiving module 306 may be configured to receive auxiliary information inputted in response to the first auxiliary verification request.

In some examples, the auxiliary information includes one or more of: a text message verification code, a user terminal token, user identity information and a second biological feature.

Herein, a type of the second biological feature is different from a type of the first biological feature.

The identity verification module 307 may be configured to obtain an identity verification result by using the auxiliary information for identity verification.

The processing module 308 may be further configured to obtain, if the identity verification result characterizes that a user indicated by the auxiliary information is the first user, the second sample feature vector for the first user based on the second feature vector, and store the second sample feature vector in the second feature vector database the second algorithm model is configured with.

Figure 9:
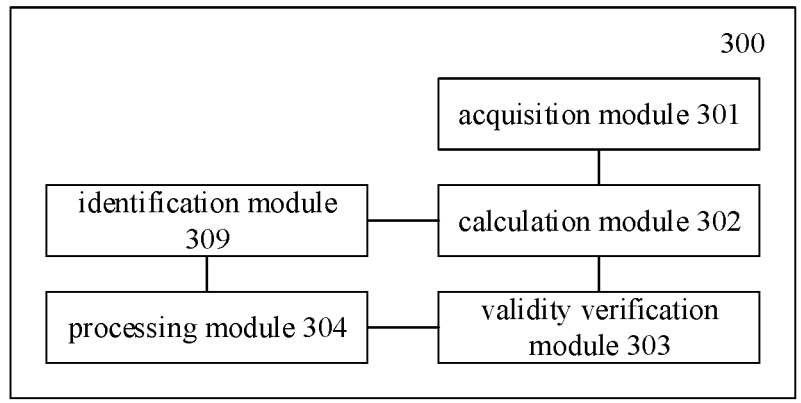
FIG. 9 shows a schematic structural diagram of yet another embodiment of an apparatus for updating a feature vector database according to the present application.

In some embodiments, after the second sample feature vector obtained based on the second feature vector is stored in the second feature vector database, the validity of the second sample feature vector can be further verified and updated in time under a condition that a service request is acquired subsequently. FIG. 9 shows a schematic structural diagram of yet another embodiment of an apparatus for updating a feature vector database according to the present application. FIG. 9 differs from FIG. 7 in that the apparatus 300 for updating a feature vector database shown in FIG. 9 may further include an identification module 309.

The acquisition module 301 may be further configured to acquire a third biological feature in a newly received service request.

The calculation module 302 may be further configured to obtain, according to the third biological feature, a first feature vector and a second feature vector corresponding to the third biological feature respectively through the first algorithm model and the second algorithm model.

The identification module 309 may be further configured to find a third sample feature vector matched with the first feature vector corresponding to the third biological feature in the first feature vector database, and determine a second user corresponding to the third sample feature vector; and further configured to perform, under a condition that a sample feature vector for the second user exists in the second feature vector database, matching in the second feature vector database using the second feature vector corresponding to the third biological feature.

The processing module 304 may be further configured to determine, if a sample feature vector in the second feature vector database successfully matched with the second feature vector corresponding to the third biological feature is the sample feature vector for the second user, that the sample feature vector for the second user is valid; and further configured to delete, if none of sample feature vectors in the second feature vector database is successfully matched with the second feature vector corresponding to the third biological feature, or if a sample feature vector in the second feature vector database successfully matched with the second feature vector corresponding to the third biological feature is not the sample feature vector of the second user, the sample feature vector for the second user from the second feature vector database, and continually acquire a service request including a biological feature of the second user to obtain a sample feature vector for the second user stored in the second feature vector database again.

In some embodiments, the identification module 309 may be further configured to: perform, under a condition that a ratio of users having sample feature vectors in the second feature vector database to users having sample feature vectors in the first feature vector database is less than a preset completion coverage rate, biological feature identification for the service request using the first algorithm model and the first feature vector database; and perform, under a condition that the ratio of the users having the sample feature vectors in the second feature vector database to the users having the sample feature vectors in the first feature vector database is greater than or equal to the preset completion coverage rate, biological feature identification for the service request using the second algorithm model and the second feature vector database.

In some examples, the processing module 304 may be further configured to: keep, if a number of second feature vectors does not reach a number required for verification, a sample feature vector for a third user corresponding to the second feature vector in the first feature vector database.

The identification module 309 may be further configured to: perform, under a condition that the third user initiates a service request, biological feature identification for the service request using the first algorithm model and the first feature vector database.

In some examples, the identification module 309 is further configured to perform, if a sample feature vector matched with a second feature vector corresponding to a fourth biological feature in the service request is not found in the second feature vector database, biological feature identification for the service request using the first algorithm model and the first feature vector database according to the fourth biological feature.

Figure 10:
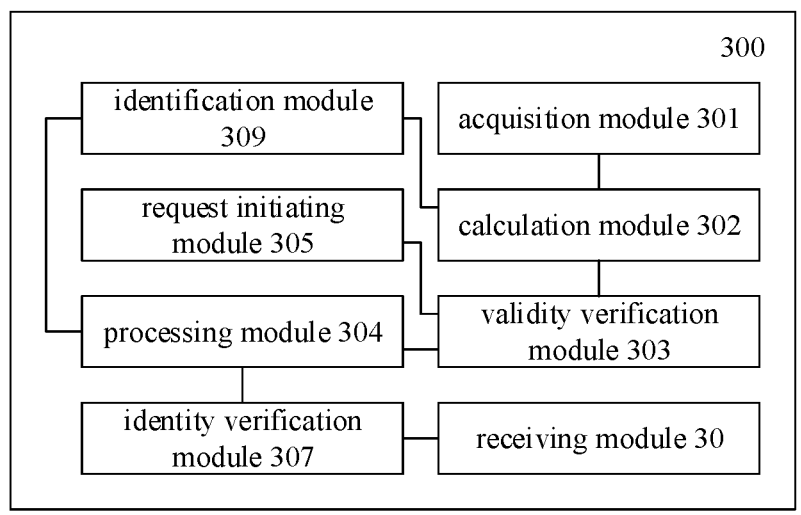
FIG. 10 shows a schematic structural diagram of yet another embodiment of an apparatus for updating a feature vector database according to the present application.

In some embodiments, a structure of the apparatus 300 for updating a feature vector database shown in FIG. 9 may be combined with a structure of the apparatus 300 for updating a feature vector database shown in FIG. 8, and under a condition that the sample feature vector matched with the second feature vector corresponding to the fourth biological feature in the service request is not found in the second feature vector database, the sample feature vector for the user is obtained using the auxiliary information and stored in the second feature vector database. FIG. 10 shows a schematic structural diagram of yet another embodiment of an apparatus for updating a feature vector database according to the present application. FIG. 10 differs from FIG. 9 in that the apparatus 300 for updating a feature vector database shown in FIG. 10 may further include a request initiating module 305, a receiving module 306, and an identity verification module 307 in FIG. 8.

The request initiation module 305 may be further configured to initiate, if a sample feature vector matched with the second feature vector corresponding to the fourth biological feature in the service request is not found in the second feature vector database, a second auxiliary verification request.

The receiving module 306 may be configured to receive auxiliary information inputted in response to the second auxiliary verification request.

The identity verification module 307 may be further configured to perform identify verification on a third user obtained according to the fourth biological feature for biological feature identification using the auxiliary information to obtain an identity verification result.

The processing module 304 may be further configured to store, if the identity verification result characterizes that a user indicated by the auxiliary information is the third user, a third sample feature vector obtained based on the second feature vector corresponding to the fourth feature vector in the second feature vector database as a sample feature vector for the third user in the second feature vector database.

Figure 11:
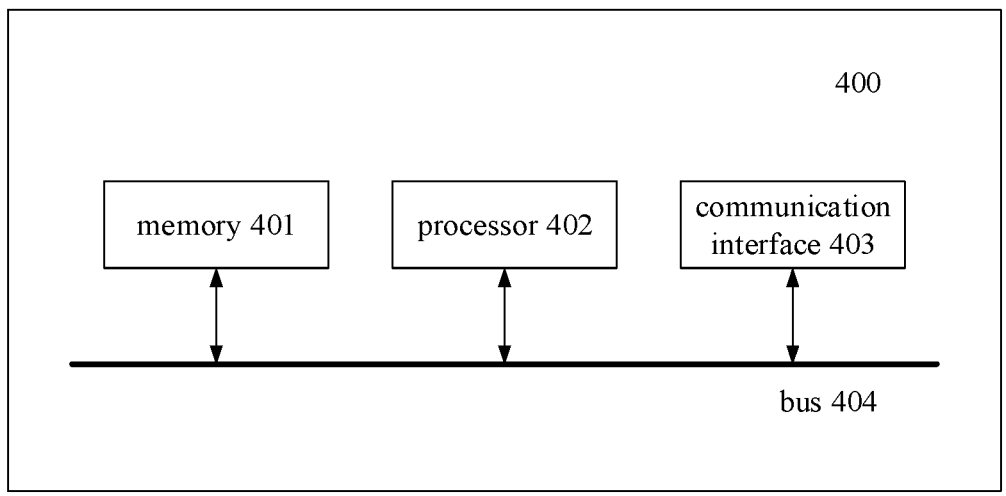
FIG. 11 shows a schematic structural diagram of an embodiment of a device for updating a feature vector database according to the present application.

The present application provides a device for updating a feature vector database. FIG. 11 shows a schematic structural diagram of an embodiment of a device for updating a feature vector database according to the present application. As shown in FIG. 11, the device 400 for updating a feature vector database includes a memory 401, a processor 402, and computer programs stored on the memory 401 and operable on the processor 402.

In some examples, the processor 402 may include a central processing unit (CPU), an application specific integrated circuit (ASIC), or one or more integrated circuits configured to implement the embodiments of the present application.

The memory 401 may include a Read-Only Memory (ROM), a Random Access Memory (RAM), a magnetic disk storage medium device, an optical storage medium device, a flash memory device, an electrical, optical or any other physical/tangible memory storage device. Thus, the memory generally includes one or more tangible (non-transitory) computer-readable storage media (for example, memory devices) encoded with software which includes computer-executable instructions, the software, when executed (for example, by one or more processors), is operable to perform the operations described with reference to the method for updating a feature vector database according to the embodiments of the present application.

The processor 402 executes a computer program corresponding to an executable program code by reading the executable program code stored in the memory 401, so as to implement the method for updating a feature vector database according to the above embodiments.

In some examples, the device 400 for updating a feature vector database may further include a communication interface 403 and a bus 404. As shown in FIG. 11, the memory 401, the processor 402, and the communication interface 403 are connected through the bus 404 and achieve mutual communication therebetween.

The communication interface 403 is mainly configured to achieve communication between various modules, apparatus, units and/or devices in the embodiments of the present application. An input device and/or an output device may also be connected through the communication interface 403.

The bus 404 includes hardware, software, or both of them, and couple the components of the device 400 for updating a feature vector database to each other. As an example rather than limitation, the bus 404 may include an Accelerated Graphics Port (AGP) or any other graphics bus, an Enhanced Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, memory bus, an Micro Channel Architecture (MCA) bus, a Peripheral Component Interconnect (PCI) bus, a PCI-Express (PCI-E) bus, a Serial Advanced Technology Attachment (SATA) bus, a Video Electronics Standards Association Local Bus (VLB) bus or any other suitable bus or any combination of two or more of the above. When appropriate, the bus 404 may include one or more buses. Although the embodiments of the present application describe and illustrate a particular bus, any suitable bus or interconnect may be considered in the present application.

The present application further provides a computer readable storage medium having stored thereon computer program instructions that, when executed by a processor, may implement the method for updating a feature vector database according to the embodiments, and can achieve the same technical effect which is not described herein in order to avoid repetition. Herein, the computer-readable storage medium may include a non-transitory computer-readable storage medium, such as a Read-Only Memory (ROM), a Random Access Memory (RAM), a magnetic disk or an optical disk, and the like, which is not limited herein.

It should be clear that, the embodiments in the specification are described in a progressive way, and the same or similar parts of each embodiment may be referred to each other. Each embodiment focuses on differences from other embodiments. For the embodiments of the apparatus, the device, and the computer-readable storage medium, reference can be made to the description of related parts in the embodiments of the method. The application is not limited to the specific steps and structures described above and shown in the figures. Those skilled in the art can make various changes, modifications and additions, or change the order between steps after understanding the gist of the application. Moreover, for the sake of brevity, a detailed description of known methods and technologies is omitted here.

Aspects of the present application are described above with reference to flowcharts and/or block diagrams of methods, devices (systems) and computer program products according to the embodiments of the present application. It should be understood that, each block in the flowcharts and/or block diagrams and a combination of any of blocks in the flowcharts and/or block diagrams may be implemented by computer program instructions. These computer program instructions may be provided to a processor of a general purpose computer, a special purpose computer, or any other programmable data processing apparatus to produce a machine such that execution of the instructions via the processor of the computer or any other programmable data processing apparatus enables implementation of the functions/acts specified in one or more blocks in the flowcharts and/or block diagrams. Such processor may be but is not limited to a general purpose processor, a special purpose processor, an application specific processor, or a field programmable logic circuit. It should also be understood that, each block in the block diagrams and/or the flowcharts and a combination of any of blocks in the block diagrams and/or the flowcharts may be implemented by special purpose hardware that performs specified functions or actions, or by a combination of the special purpose hardware and computer instructions.

Those skilled in the art should understand that, the embodiments are all illustrative rather than restrictive. Different technical features recited in different embodiments can be combined to achieve beneficial effects. Those skilled in the art should be able to understand and implement other modified embodiments of the disclosed embodiments on the basis of studying the drawings, the description, and the claims. In the claims, the term "including" does not exclude other devices or steps, the numeral word "a/an" does not exclude a plurality of the involved items; the terms "first" and "second" are used to indicate names and not to indicate any particular order. Any reference signs in the claims should not be construed as limiting the protection scope. The functions of several parts recited in the claims can be implemented by a single hardware or software module. Some technical features are recited in different dependent claims, but it does not mean that these technical features cannot be combined to obtain beneficial effects.

What is claimed is:

1. A method for updating a feature vector database, comprising:

acquiring a first biological feature in a service request;

obtaining, according to the first biological feature, a first feature vector and a second feature vector respectively through a first algorithm model and a second algorithm model, wherein a version of the first algorithm model is different from a version of the second algorithm model, and the first algorithm model is configured with a first feature vector database comprising a sample feature vector obtained based on the first algorithm model;

performing validity verification on the second feature vector according to an associated feature vector of a first user corresponding to a first sample feature vector, wherein the first sample feature vector is a sample feature vector successfully matched with the first feature vector in the first feature vector database, and the associated feature vector comprises at least a portion of: the first feature vector, the second feature vector, and at least a portion of history feature vectors corresponding to the first algorithm model; and obtaining, under a condition that the validity verification on the second feature vector passes, a second sample feature vector of the first user based on the second feature vector, and storing the second sample feature vector in a second feature vector database, wherein the second algorithm model is configured with the second feature vector database.

2. The method according to claim 1, wherein the validity verification comprises one or more of:

reliability verification, first difference verification, and second difference verification.

3. The method according to claim 2, wherein the associated feature vector comprises the first feature vector and the history feature vectors corresponding to the first algorithm model; and
the reliability verification comprises:
calculating first similarities between the first feature vector and the at least a portion of history feature vectors corresponding to the first algorithm model respectively; and
determining that the reliability verification passes if none of the first similarities is less than a first judgment threshold.

4. The method according to claim 2, wherein the associated feature vector comprises the first feature vector and the second feature vector;
the first difference verification comprises:
calculating, using a plurality of second feature vectors obtained based on a plurality of service requests of the first user, a maximum angle among the plurality of second feature vectors;
calculating, using a plurality of first feature vectors obtained based on the plurality of service requests of the first user, a maximum angle among the plurality of first feature vectors; and
determining that the first difference verification passes if the maximum angle among the plurality of second feature vectors is less than the maximum angle among the plurality of first feature vectors.

5. The method according to claim 2, wherein the associated feature vector comprises the second feature vector;
the second difference verification comprises:
acquiring a plurality of second feature vectors obtained based on a plurality of service requests of the first user;
calculating second similarities between every two of the plurality of second feature vectors respectively;
determining that the second difference verification passes if none of the second similarities is less than a second judgment threshold.

6. The method according to claim 1, further comprising:
initiating a first auxiliary verification request under a condition that the validity verification on the second feature vector does not pass;
receiving auxiliary information input in response to the first auxiliary verification request;
obtaining an identity verification result by using the auxiliary information for identity verification; and
obtaining, if the identity verification result characterizes that a user indicated by the auxiliary information is the first user, the second sample feature vector of the first user based on the second feature vector, and storing the second sample feature vector in the second feature vector database.

7. The method according to claim 6, wherein the auxiliary information comprises one or more of a text message verification code, a user terminal token, user identity information and a second biological feature;
a type of the second biological feature is different from a type of the first biological feature.

8. The method according to claim 1, wherein obtaining the second sample feature vector of the first user based on the second feature vector comprises:
determining the second feature vector as the second sample feature vector; or
calculating a mean vector of a plurality of second feature vectors obtained based on a plurality of service requests of the first user, and determining the mean vector as the second sample feature vector; or
determining a second feature vector acquired last time among the plurality of second feature vectors obtained based on the plurality of service requests of the first user as the second sample feature vector.

9. The method according to claim 1, wherein after obtaining, according to the first biological feature, the first feature vector and the second feature vector respectively through the first algorithm model and the second algorithm model, the method further comprises:
under a condition that a user of the service request is a known user, and if the first feature vector is successfully matched with a sample feature vector of the known user in the first feature vector database, storing the second feature vector in the second feature vector database as a sample feature vector of the known user in the second feature vector database.

10. The method according to claim 1, wherein after storing the second sample feature vector in the second feature vector database, the method further comprises:
acquiring a third biological feature in a newly received service request;
obtaining, according to the third biological feature, a first feature vector and a second feature vector corresponding to the third biological feature respectively through the first algorithm model and the second algorithm model;
searching for a third sample feature vector matched with the first feature vector corresponding to the third biological feature in the first feature vector database, and determining a second user corresponding to the third sample feature vector;
performing, under a condition that a sample feature vector of the second user exists in the second feature vector database, matching in the second feature vector database using the second feature vector corresponding to the third biological feature;
determining that the sample feature vector of the second user is valid if a sample feature vector in the second feature vector database successfully matched with the second feature vector corresponding to the third biological feature is the sample feature vector of the second user;
deleting, if none of sample feature vectors in the second feature vector database is successfully matched with the second feature vector corresponding to the third biological feature, or if a sample feature vector in the second feature vector database successfully matched with the second feature vector corresponding to the third biological feature is not the sample feature vector of the second user, the sample feature vector of the second user from the second feature vector database, and continually acquiring a service request comprising a biological feature of the second user to obtain a sample feature vector of the second user stored in the second feature vector database again.

11. The method according to claim 1, further comprising:
performing, under a condition that a ratio of users having sample feature vectors in the second feature vector database to users having sample feature vectors in the first feature vector database is less than a preset completion coverage rate, biological feature identification for the service request using the first algorithm model and the first feature vector database; and
performing, under a condition that the ratio of the users having the sample feature vectors in the second feature vector database to the users having the sample feature vectors in the first feature vector database is greater than the preset completion coverage rate, biological feature identification for the service request using the second algorithm model and the second feature vector database.

12. The method according to claim 11, further comprising:
keeping, if a number of second feature vectors does not reach a number required for verification, a sample feature vector of a third user corresponding to the second feature vector in the first feature vector database; and
performing, under a condition that the third user initiates a service request, biological feature identification for the service request using the first algorithm model and the first feature vector database.

13. The method according to claim 11, further comprising:
performing, if a sample feature vector matched with a second feature vector corresponding to a fourth biological feature in the service request is not found in the second feature vector database, biological feature identification for the service request using the first algorithm model and the first feature vector database according to the fourth biological feature.

14. The method according to claim 13, wherein after performing biological feature identification for the service request using the first algorithm model and the first feature vector database according to the fourth biological feature, the method further comprises:
initiating a second auxiliary verification request;
receiving auxiliary information input in response to the second auxiliary verification request;
performing, using the auxiliary information, identify verification on a third user obtained by performing biological feature identification according to the fourth biological feature, to obtain an identity verification result;
storing, if the identity verification result characterizes that a user indicated by the auxiliary information is the third user, a third sample feature vector obtained based on the second feature vector corresponding to the fourth feature vector in the second feature vector database, and using the third sample feature vector as a sample feature vector of the third user in the second feature vector database.

15. A device for updating a feature vector database, comprising: a processor and a memory storing computer program instructions; wherein
the computer program instructions, when executed by the processor, implements the method for updating the feature vector database according to claim 1.

16. A computer-readable storage medium having computer program instructions stored thereon, wherein the computer program instructions, when executed by a processor, implements the method for updating the feature vector database according to claim 1.

* * * * *